United States Patent [19]

Zuk

[11] Patent Number: 4,953,972
[45] Date of Patent: Sep. 4, 1990

[54] RANGE DISPERSION SENSOR
[75] Inventor: David M. Zuk, Ann Arbor, Mich.
[73] Assignee: Environmental Research Institute of Michigan, Ann Arbor, Mich.
[21] Appl. No.: 290,754
[22] Filed: Dec. 27, 1988
[51] Int. Cl.⁵ ............................................. G01C 3/08
[52] U.S. Cl. ........................................ 356/4; 356/3; 356/5; 356/21; 342/123; 342/130
[58] Field of Search ............................ 356/3, 21, 4, 5; 342/27, 123, 124, 130

[56] References Cited
U.S. PATENT DOCUMENTS

| | | | |
|---|---|---|---|
| 2,436,627 | 2/1948 | Blitz | 342/130 |
| 3,068,471 | 12/1962 | Erst | 342/130 |
| 4,413,904 | 8/1983 | Hamada et al. | 356/5 |
| 4,537,502 | 8/1985 | Miller et al. | 356/5 |
| 4,689,489 | 8/1987 | Cole | 250/560 |
| 4,699,508 | 10/1987 | Bolkow et al. | 356/5 |
| 4,743,110 | 5/1988 | Arnaud et al. | 356/5 |
| 4,744,653 | 5/1988 | Sano et al. | 356/5 |

Primary Examiner—Thomas H. Yarcza
Assistant Examiner—Linda J. Wallace
Attorney, Agent, or Firm—Krass and Young

[57] ABSTRACT

A range dispersion sensor operative to detect objects of a preselected height "h" operates on quarterwave interference principles. Electromagnetic energy is modulated at a first frequency $f_1$ such that objects of the preselected height h disposed upon a background create a quarter-wave length reflector. A beam of electromagnetic energy reflected from an object of height h and its proximate background interferes destructively to create a null signal. Effects of non-uniform reflectivity are normalized by modulating the beam at a second frequency $f_2$ selected to not create constructive or destructive interference effects with objects of the preselected height. The ratio of the two signals is taken thereby normalizing the effects of non-uniform reflectivity, and the resultant ratio is indicative of the height of the objects.

25 Claims, 7 Drawing Sheets

FIG. 13B  Image
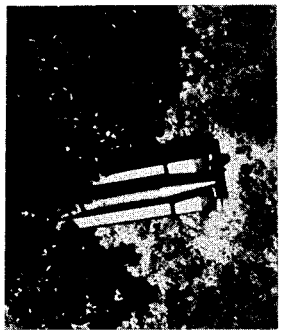
FIG. 13A  Scene
FIG. 13C  Image

RANGE DISPERSION SENSOR

FIELD OF THE INVENTION

This invention relates generally to remote sensing and measuring and more particularly to techniques for determining the height of objects with respect to a background. Most particularly, the present invention relates to a method and apparatus which analyzes the reflection of a transmitted beam of electromagnetic energy for determining the height of an object wherein the effects of nonuniform reflection of the energy from the object and background are normalized.

BACKGROUND OF THE INVENTION

Object recognition and detection is important in a great variety of automated systems. Apparatus and methods for determining the heights of objects disposed upon a background field or for recognizing and locating objects of a particular, preselected height, within a visual field, are of great utility in a variety of applications.

Height is one readily knowable, and relatively invariant physical constant of an object and can provide the basis for the detection of the presence of particular objects. Remote, i.e., non-contact, sensor systems which are capable of detecting the heights of objects, or alternatively, identifying objects of a given height, have applications in many areas. For example, systems of this type may be readily adapted to inspect fabricated articles for dimensional tolerances. Similarly, materials handling systems may be provided with height recognition capabilities to allow them to identify and classify individual members of a mixed assembly of parts and appropriately direct each of the items to an appropriate destination.

Height detection capability would be of great utility in a target acquisition and/or identification system since the height of a variety of objects of military significance such as tanks, trucks, armored personnel carriers and other such vehicles is a readily knowable and invariant feature. A sensing system with height detection capability will allow for a ready selection of significant targets, from a plurality of potential targets in a zone. Similarly, height detection allows for good correlation of an identified target with its origin, i.e., friend or foe. A sensor having the ability to detect heights of objects can be utilized to identify and classify the nature of potential targets as well as direct weapons and/or tracking systems to the target.

The earliest measurements of object heights were implemented with techniques which rely upon the use of standards and require contact with the object being measured. More refined non-contact techniques soon evolved which employ trigonometry or other mathematical analyses to deduce object height. Relatively recently, non-contact optical techniques have been implemented for height measurement. One prior art optical technique involves the use of a pair of stereo images, that is to say, a pair of photographic images made from two different points of view. If the distance to the object and the spacing of the two points of view is known, the images may be processed to determine the height of various features therein. This technique requires creation of a pair of images as well as a relatively complex processing operation.

Interferometric techniques are quite well known for the measurement of distances, as well as heights. Such techniques rely upon the wave aspects of a beam of electromagnetic energy. One type of interferometric technique involves the heterodyning of two light beams of differing frequencies; and in one general embodiment, a pair of light beams of differing frequencies are directed onto an object and onto a reference plane. The return beams are processed in various manners to determine the distance and/or height of objects, based upon the patterns of the reflected waves. Such techniques are disclosed in U.S. Pat. Nos. 4,650,330; 4,744,653 and 4,572,669. Techniques such as the foregoing generally utilize rather complicated optical systems to provide, direct and sense the multiple beams of different frequencies. In general, techniques of this type provide for very accurate height and distance measurement; however, the useful range of operations is typically of the magnitude of the light waves themselves. That is to say, such systems are generally utilized for measurements in the sub-micron to micron size range. As a consequence, systems such as those disclosed in the above-referenced patents are not utilized for the measurement of the heights of large objects.

U.S. Pat. No. 4,689,489 shows a technique wherein height analysis is implemented in a macroscopic system. Disclosed therein is a method for measuring the height of fluid in tanks which involves modulating a beam of visible light at radio frequencies, reflecting the beam from the fluid in the tank and comparing the reflected beam with a reference beam. The frequency of modulation is adjusted until the reflected beam and reference beam are matched and the ratio of frequencies is utilized to determine fluid height. A system of this type requires a separate reference beam and is relatively slow in operation; accordingly, it is not suited for situations where rapid data acquisition is needed. Systems of this type are not suitable for the aforementioned military applications.

Accordingly, it will be appreciated that there is needed a simple, quick and low-cost method and apparatus for remotely determining the height of relatively large objects. The present invention meets the foregoing criteria. As will be disclosed in greater detail hereinbelow, the present invention provides a sensor which relies upon interference phenomenon in a single beam of electromagnetic energy modulated at appropriate frequencies. It is to be understood that the methods and apparatus of the present invention may be implemented with electromagnetic energy of any frequency. Consequently, as utilized herein, the term "light" shall refer to any portion of the electromagnetic spectrum and the term "optics" shall not be limited to any particular portion of the electromagnetic spectrum.

The phenomenon of interference occasioned by reflection of a monochromatic beam of electromagnetic energy from a quarter-wave plate is well-known in the optical arts. Briefly put, a beam of monochromatic energy reflected from the two portions of a step dimensioned to be one-fourth wavelength of the monochromatic beam (or odd multiples thereof) undergoes destructive interference. That is to say, the energy is equally reflected from the top and bottom of the step and interferes to produce a reflected signal of theoretically zero intensity. Conversely, if the step is dimensioned to be one-half wavelength (or integer multiples thereof), the reflected energy undergoes constructive interference and the reflected signal is a maximum.

In accord with the principles of the present invention, detection of objects of a preselected height, within a target zone, may be readily accomplished by directing a beam of electromagnetic energy modulated at a frequency "$f_1$" such that $f_1=(c/4h)$, wherein c is the speed of light and h is the preselected height. If objects of the preselected height are within that zone, they will create a quarter-wave step in conjunction with the background field and the signal reflected therefrom will be a null, or low value. The locations of the null signals will correlate with objects of the preselected height. It should be noted that the frequency of modulation can, (and usually does) differ from the basic frequency of the beam.

Referring now to FIG. 1, there is shown a schematic representation of the intensity of a beam of electromagnetic energy, modulated at a given frequency f, as reflected from objects of various heights. The modulation frequency f is selected such that objects of the height "h" will create a quarter-wave situation, (i.e., $f=c/4h$). As it will be seen, the signal has minima at the points corresponding to the height h, as well as odd multiples thereof. In principle, a system of this type may be readily employed to detect objects of a preselected height "h" as well as to ascertain heights of other objects. It will be noted that a maximum signal is obtained at values half the selected height and multiples thereof, and that signal intensity between maxima and minima will correlate with object height. While under idealized situations, a response such as that of FIG. 1 is provided utilizing the techniques disclosed herein, in reality problems can occur because various objects in a target zone, the background field and even different portions of a single object reflect the beam of energy with different efficiencies.

These problems are illustrated with reference to FIG. 2 where there is shown a representation of the intensity of reflected electromagnetic energy versus object height generally similar to that of FIG. 1 but for four different levels of reflectivity $p_1-p_4$. As will be noted, the position of the maxima and minima are relatively unchanged, however the magnitude of the maxima varies. Information such as that represented in FIG. 2 is of little use in height determination. While a simple pattern of data such as that of FIG. 1 would allow one to determine height of an object by measuring the intensity of the reflected electromagnetic energy, obviously such could not be done with the data of FIG. 2. It would not be known whether a given signal level represents maximum for a low reflectivity object or if it were a value tending toward a minimum for a higher reflectivity object. The complex reflection pattern also tends to make detection of minima very difficult.

It will thus be appreciated that there is a need to "normalize" the effects of non-uniform reflectivity so as to provide an output signal indicative of height but independent of variations in reflectivity of objects in a target zone. The present invention provides for a method and apparatus for sensing object height which allows for the normalizing or negating of the effects of non-uniform reflectivity. The device of the present invention is referred to as a "Range Dispersion Sensor" and it is a device which is relatively simple to fabricate and use and which has the capability of rapidly, simply and economically acquiring and/or measuring the height of an object in a target zone with a single sensor scan. The techniques disclosed herein permit very simple decision logic to be implemented for target detection, classification and/or warhead fusing cues. With multiple scans, the range dispersion techniques disclosed herein permit visual imaging of the edges of objects. These and other features of the present invention will be readily apparent from the drawings, discussion, description and claims which follow.

BRIEF DESCRIPTION OF THE INVENTION

There is disclosed herein a range dispersion sensor comprising a source operative to provide an output beam of electromagnetic energy; a modulator associated with the source and operative in conjunction therewith to modulate the output beam at a first frequency "$f_1$" and a second frequency "$f_2$." The sensor further includes means for directing the beam onto a target zone for reflection therefrom as well as means for detecting the reflected electromagnetic energy and providing a first detector signal corresponding to detected energy modulated at $f_1$ and a second detector signal corresponding to detected energy modulated at $f_2$. The sensor further includes processing means for receiving and comparing the first and second detector signals and providing an output signal corresponding to the ratio thereof.

In a further embodiment, the range dispersion sensor is operative to detect the presence of objects of a preselected height "h" disposed upon the surface of the target zone and in such embodiment, the modulator modulates the output beam at a first frequency $f_1$ such that $f_1=(c/4h)$ wherein c is the speed of light. In yet a further refinement, the modulator is also operative to modulate the output beam at a second frequency $f_2$ such that $f_2 \neq (c/4h)$. In this embodiment the first detector signal corresponds to both the height of the object and the intensity profile of the electromagnetic energy reflected therefrom, and the second signal corresponds to the intensity profile of the reflected energy and is sensitive to a different height than the $f_1$ signal. If in such embodiment, the processing means is operative to measure the ratio of the first detector signal to the second detector signal, it will produce an output signal normalized with regard to reflection and indicative of the heights of objects within the target zone.

The source in one preferred embodiment may be a laser and the detector may include photo-sensitive elements such as photo diodes, photo conductors or photovoltaic cells as well as band pass filters to allow selection of the signals from the different reflected frequencies. In other embodiments, the source may be a source of microwave or millimeter wave energy or it may be a source of infrared energy and the detector may comprise an antenna, thermal detector or the like, as appropriate.

The sensor may further be operative to modulate the output beam at yet other frequencies ($f_3 \ldots f_n$) and the detector accordingly adapted to detect the various frequencies.

The sensor may include display means for providing a visual display and, in some instances, the beam directing means may be operative to scan the beam across a target zone as for example in a raster pattern, to build up an image of objects within the zone.

The present invention also includes a method for determining the heights of objects by the use of the aforedescribed sensors.

BRIEF DESCRIPTION OF THE DRAWINGS

FIG. 13A is a photograph of a target zone;

FIG. 13B is a photograph of a visual display of the output of a sensor of the present invention resultant from a series of scans of the target zone with a relatively large diameter beam; and, FIG. 13C is a photograph of a visual display of the output of a sensor of the present invention from a series of scans of the target zone with a relatively small diameter beam.

DETAILED DESCRIPTION OF THE INVENTION

As was discussed previously, the present invention involves an interferometric technique which may be employed to sense the presence of objects of a preselected height, or to measure the heights of objects, in a target zone by impinging a beam of electromagnetic energy modulated at a frequency such that objects of a preselected height will effectively form a quarter-wave step for the modulated beam. A null reflected signal is indicative of objects of the preselected height; the magnitude of the reflected signal may also be employed to determine other heights. Problems arise in the use of this basic version of the technique when reflectivity of the objects and the background in the target zone varies. Such variations in reflectivity can mask or obscure the reflected signal. According to the present invention, there is provided apparatus and method whereby the effects of non-uniform reflectivity may be normalized.

Figure 1:
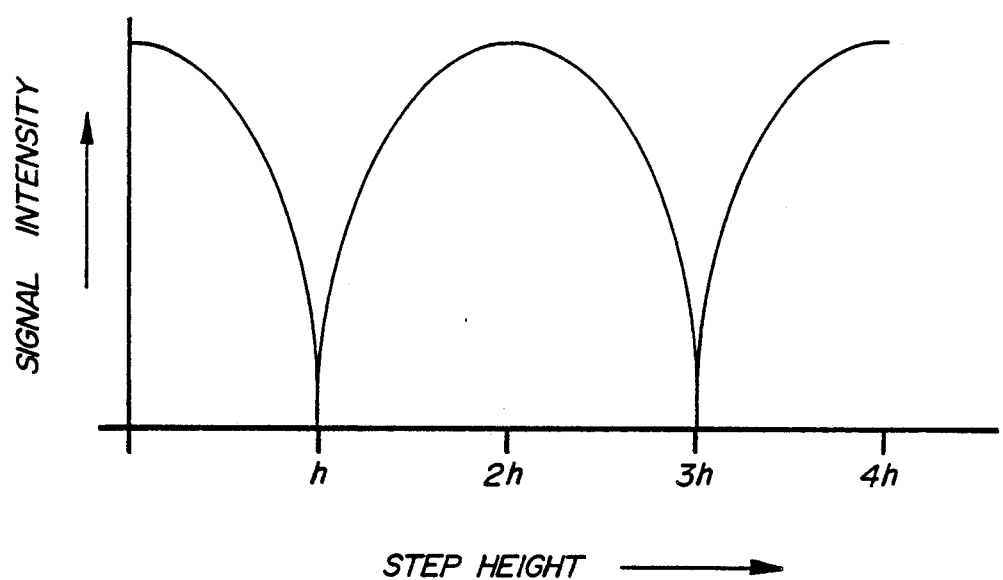
FIG. 1 is a graphic representation of the intensity of a beam of electromagnetic energy modulated at a given frequency $f_1$ and reflected from steps of various heights.
Figure 2:
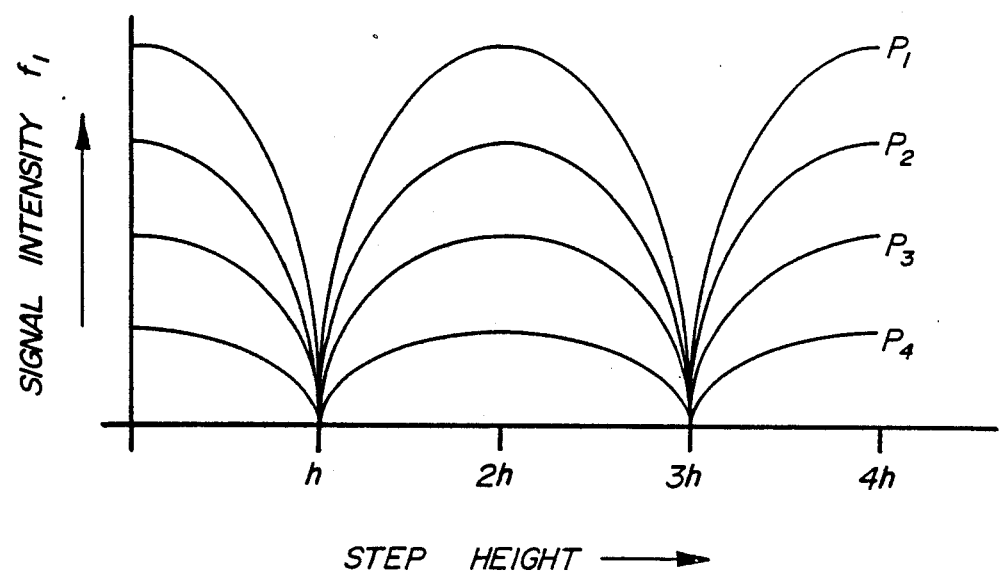
FIG. 2 is a graphic representation of the same beam of FIG. 1 for four different values of reflectivity of the step.

The problems of non-uniform reflectivity and their effect upon interferometric data has been previously discussed with reference to FIG. 2. According to the present invention, the beam of electromagnetic energy impinged upon the target zone is further modulated at a second frequency $f_2$ and it is preferred that this frequency be selected so as to not create a quarter-wave length situation for objects within the height range of interest. In accord with these requirements, there are many values for $f_2$ available, (including zero, as will be explained in greater detail hereinbelow).

Figure 3:
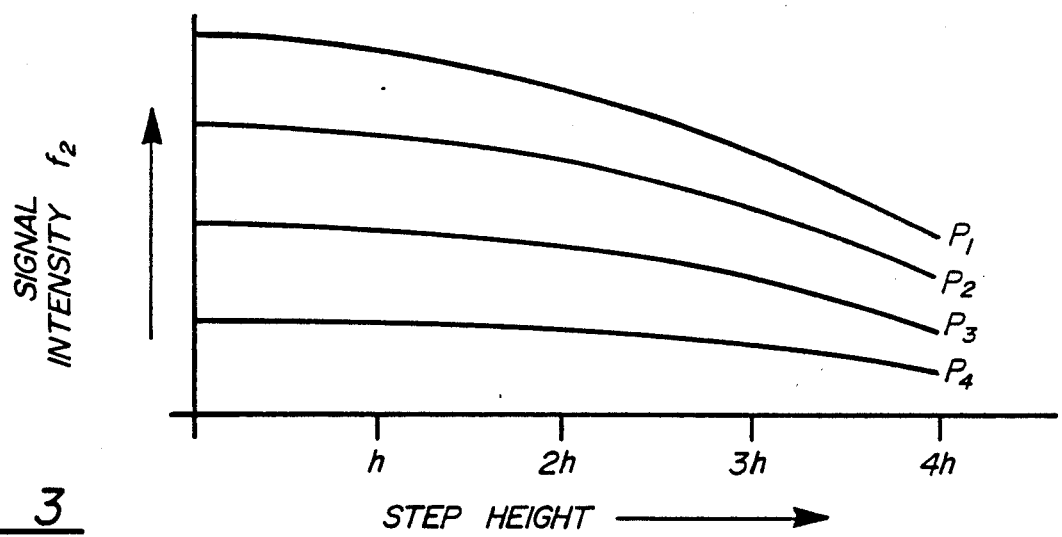
FIG. 3 is a graphic representation of a beam of electromagnetic energy modulated at a second frequency $f_2$ as reflected from steps of various height for four different reflectivity values of the step.

Referring now to FIG. 3, there is shown a graphic representation of the reflected intensity of an electromagnetic energy beam modulated at a second frequency $f_2$ and reflected from varying step heights corresponding to those in the foregoing figures. Furthermore, FIG. 3 depicts such data for four different values of reflectivity $p_1-p_4$ corresponding generally to the four values of FIG. 2. The modulation frequency $f_2$ is selected such that a quarter-wave length relationship is avoided for step heights at least up to 4h. It will be noted from the figure that the signal intensity shows a slight decrease going from a step height of 0 to a height of 4h. In accord with the aforedescribed principles of optical interference it will be appreciated by one of skill in the art that at some point step height will be sufficiently large and the modulation frequency $f_2$ such that a null condition is established; however, in the height range of interest (i.e., 0–4h) it will be noted that no such nulling occurs. Obviously, $f_2$ may be selected to extend this height range to greater multiples of h, (or to likewise contract the range), and selection of a value for $f_2$ may be readily accomplished by one of skill in the art.

It is preferable that the electromagnetic energy used in the present invention be of a single wavelength and be modulated at two different frequencies. Thus the reflectivity characteristics for objects in the target zone will generally be the same for the two modulation frequencies insofar as the fundamental wavelength will remain unchanged. An inspection of the graphs of FIG. 2 and FIG. 3 makes apparent the fact that the beam modulated at the first frequency $f_1$ conveys information relating both to reflectivity of the various objects in the target zone as well as the heights of those objects; whereas, the beam modulated at $f_2$ carries the same information relating to reflectivity as $f_1$, but is sensitive to a different set of heights than $f_1$.

As was mentioned hereinabove, the beam modulated at $f_2$ conveys information relating to reflectivity as does $f_1$, but is chosen to be sensitive to a different step height. Accordingly, the $f_2$ beam may be modulated at a frequency of zero (i.e. no modulation). The reason for the second modulation ($f_2$) is to enable its detection amidst ambient illumination from sunlight etc. By use of a detector tuned to the particular modulation frequency, a modulated, reflected signal may be readily separated from background illumination of a similar wavelength. In those instances where ambient illumination will not present any interference, the second (i.e. $f_2$) modulation is not needed to obtain a signal that is proportional to reflectance. The detector will simply detect both the unmodulated signal as reflected from the field and ratio it with the $f_1$ modulated signal as described. This particular mode of operation may be advantageously applied when the range dispersion sensor is operating at infrared, millimeter wave or microwave wavelengths since ambient illumination at these wavelengths is generally minimal. Similarly, this mode of operation may be applied at visible wavelengths if interference from sunlight is minimal.

Figure 4:
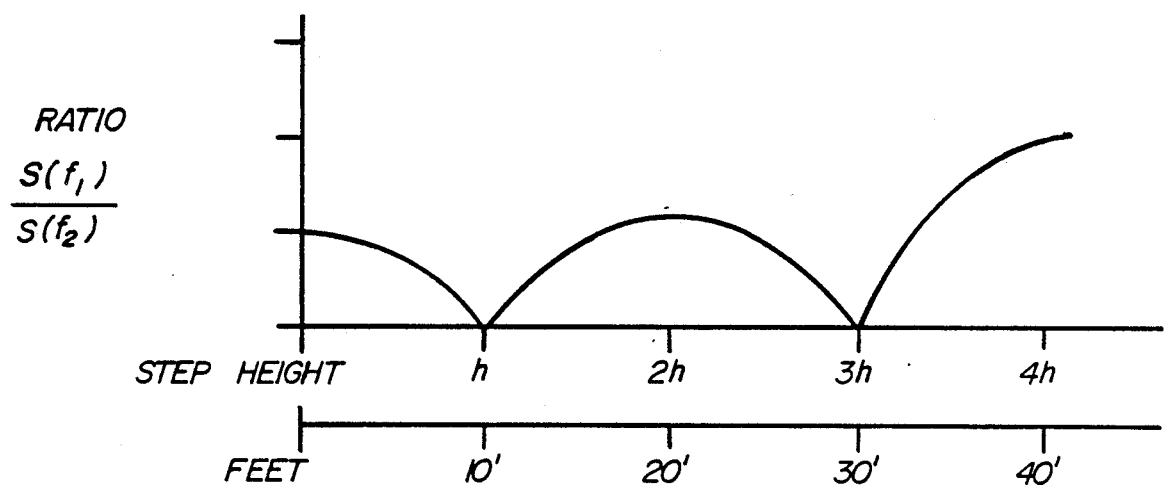
FIG. 4 is a graphic representation of the ratios of the signals of FIGS. 2 and 3 as a function of step height showing the normalization of reflectivity differences.

With such information in hand, the signals are processed to normalize reflectivity and provide an indication of height independent of reflectivity. Referring now to FIG. 4 there is shown the result of such a normalization. Depicted therein is the ratio of the signal intensity at $f_1$ to the signal intensity at $f_2$, plotted as a function of step height. In taking such a ratio, contributions relating to intensity are canceled out whereas the component of the signal relating to height remains.

It will be noted that the resultant curve produced by this operation still includes a number of maxima and minima; however, it will be appreciated that by appropriately selecting the value for h and the corresponding frequency $f_1$, a height range providing much useful information can be obtained. For example, if the height h is selected as being 10 feet, the entire range from 0 to 20 feet may be represented by a single maximum and minimum cycle. It will of course be appreciated that there could possibly be some ambiguity as to whether an object is one foot tall or approximately 18 feet tall; however, clues may be obtained in context to allow appropriate decisions to be made and in any event, objects of the selected 10 foot height would be unambiguously identified. If a ten foot height were selected, null points would similarly be noted for 30 and 50 foot heights; however, as mentioned previously, contextual clues could be employed to reject such data.

Figure 5:
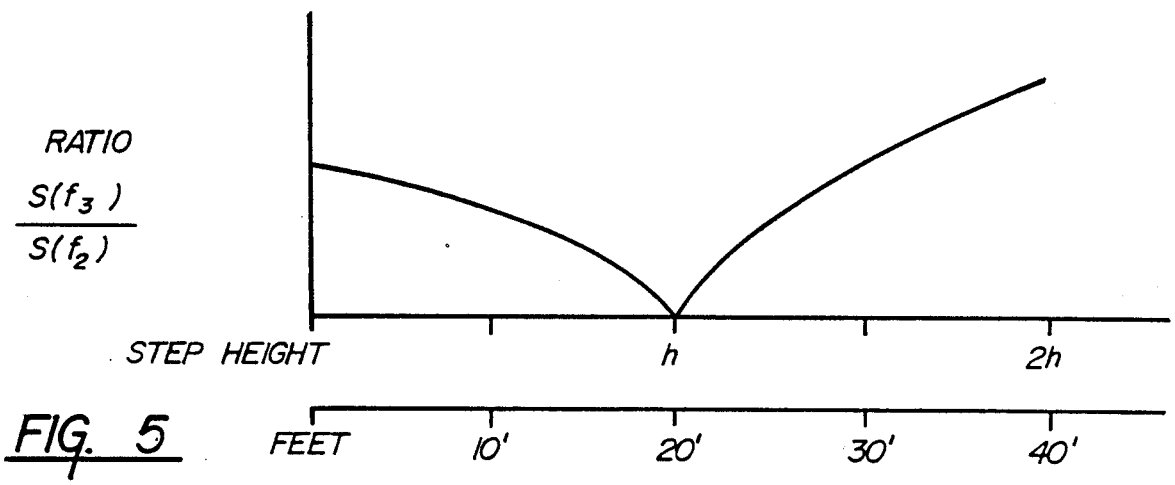
FIG. 5 is a graphic representation of the ratios of the signal corresponding to the intensity of electromagnetic energy modulated at a third frequency $f_3$, to the signal of FIG. 3, as a function of step height.

In a further refinement of the invention still further frequencies may be employed to better determine object height. For example, as illustrated in FIG. 5, a third modulation frequency $f_3$ may be selected such that h, for $f_3$, would be twice the magnitude of its value in FIG. 4. That is to say that if h corresponded to 10 feet in FIG. 4, h would be 20 feet in FIG. 5. In such instance, the signal resultant from reflected energy which was modulated at $f_3$ could similarly be ratioed with the signal from $f_2$ to develop a reflectance-normalized signal such as that illustrated in FIG. 5. Clearly, by reference to data such as that of FIG. 4 in combination with data such as that of FIG. 5, heights may be precisely and unambiguously determined. Therefore, in keeping with the present invention, a plurality of frequencies $f_3 \ldots f_n$ may be similarly employed, each frequency selected to provide a null at a particular wavelength. Through the use of various data processing techniques, such multiple signals could be readily processed to provide accurate and unambiguous height data for objects having a plurality of heights extending over a large expected range. In many situations however, use of a relatively limited height range would suffice and hence a simple dual frequency technique would be adequate.

Figure 6:
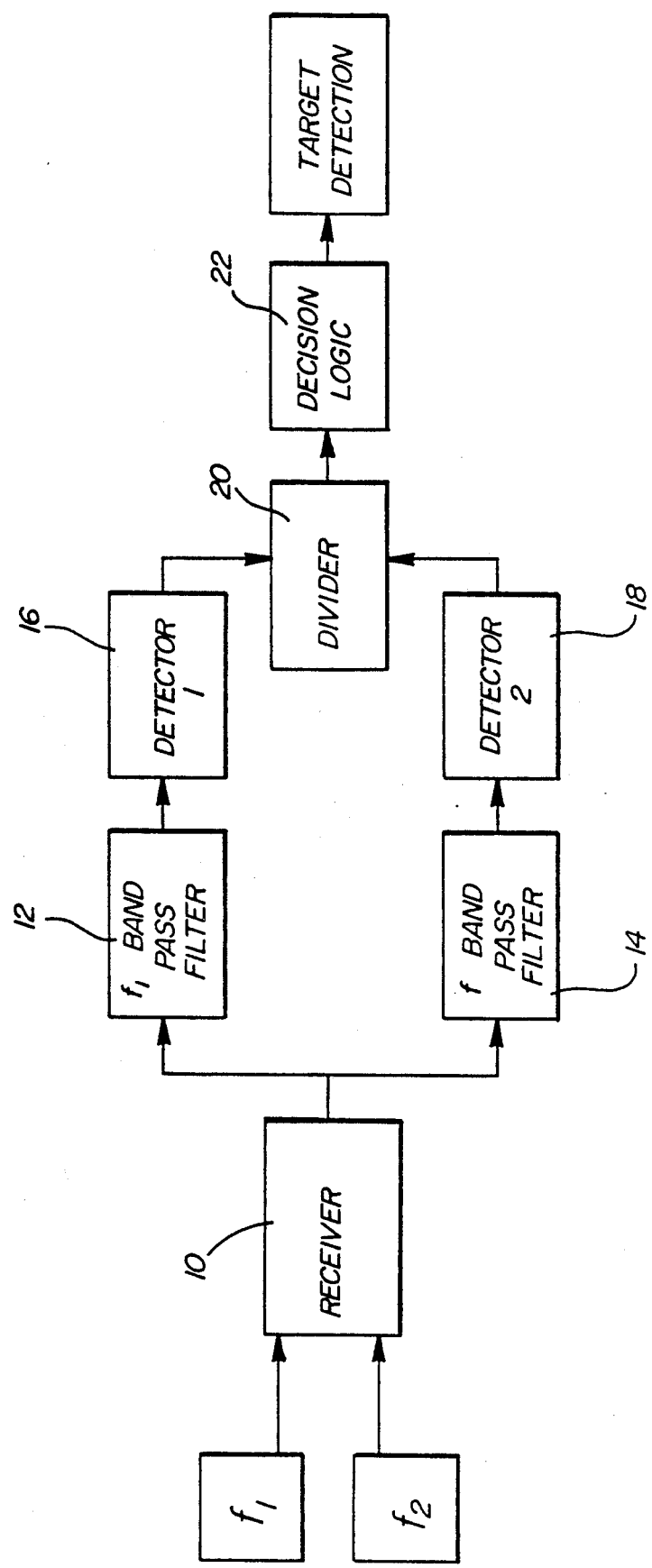
FIG. 6 is a block diagram of one embodiment of detection circuitry which may be employed in the present invention.

There are a great many arrangements of hardware and a great many detection and processing schemes which may be utilized in carrying out the present invention. Referring now to FIG. 6, there is shown a block diagram illustrating one particular embodiment of the detection and processing portion of a range dispersion sensor. As illustrated, signals $f_1$ and $f_2$ corresponding to electromagnetic energy modulated at the particular frequencies and reflected from the target zone impinge upon a receiver 10 which may be a photo responsive device such as a photo diode, photoconductive device, a thermal detector a microwave receiver or other such device; the choice of receiver being determined by the wavelength of the electromagnetic energy employed. The receiver 10 converts the received energy into an electrical signal which is then supplied to a pair of band pass filters. The first band pass filter 12 is operative to pass electrical signals in a frequency range corresponding to the modulation frequency $f_1$; and similarly, the second band pass filter 14 is operative to pass signals in a range corresponding to the second frequency $f_2$.

Associated with the first band pass filter 12 is a first detector 16 disposed to receive the filtered signal and provide a detector output signal corresponding thereto. This detector may optionally include an amplifier or other signal conditioning circuitry. A second detector 18, generally similar to the first detector 16, is disposed to receive the output from the second band pass filter 14 and provide an output signal corresponding thereto. In those instances, as discussed hereinabove, where the $f_2$ modulation frequency is zero, the $f_2$ band pass filter 14 may be dispensed with. The unmodulated component of the reflected illumination will simply be detected; and this detected signal, which conveys information regarding the reflectivity of the target zone, will be processed as set forth herein.

The output signals from the detectors are conveyed to processing means which in this instance includes a divider 20 for ratioing the two signals. Output of the divider 20 is conveyed to a block of decision logic 22 which may include a microprocessor as well as pattern recognition software or other such means for signal processing therein. The output of the decision logic may be employed in various manners. Such information may in some embodiments be processed to provide target detection signals. As will be explained in greater detail hereinbelow, the signals can be processed to provide a visual indication of the presence of a target and can optionally include an image of the outline of the target. In other instances the information is directly applied to weapons control systems for aiming and/or arming and/or discharging a weapons system.

In the above-referenced embodiment, the output signal from the divider embodies information relating to features within the target zone, which information is independent of reflectivity of those features. The output signal is a ratio and has given rise to the term "AM ratio cueing." The signal or ratio can be operated on in several different ways to provide the various required decisions such as target detection, aim point selection, etc. It is noteworthy that sufficient information is available in the sensor output to accomplish the desired detection and identification functions without the need to form an actual target zone image and without recourse to the use of expensive and complex imaging processing techniques.

The techniques disclosed herein may be implemented with electromagnetic energy of any wavelength; hence, the sensor of the present invention may include light sources of many different configurations which will be readily apparent to those of skill in the art. For example, one embodiment employs a laser or other source of high intensity, collimated, monochromatic light in the visible and rear infrared portions of the electromagnetic spectrum, utilized in conjunction with a modulator and appropriate optics for delivering a beam to the target zone. Modulation of the laser may be by any conventional technique such as Q-switching, pockels cells, liquid crystal light valves and the like. In other instances it is advantageous to employ longer wavelength radiation and hence the apparatus may include a source of microwave millimeter, or far infrared energy such as a Klystron, magnetron or other such device well known to those of skill in the art.

In some particular embodiments, there may be included two separate modulators; alternatively, two light sources each having its own modulator, may be employed in other embodiments. The optical system may in some instances simply include means for directing the beam of modulated light to the target zone for reflection therefrom whereas in other embodiments, the optical system may further include means for scanning the modulated beam across the target zone as for example in a raster pattern to build up imaging data.

In one particular embodiment of the present invention, the light source is a gallium arsenide laser diode having a nominal output of 1 watt at 811 nm. This laser is modulated by modulating the power supplied thereto. The diode is coupled to an optical system via a fiber optic cable and total power delivered therefrom is approximately 500 mW. The optical system includes alternative elements selectable to provide a field of view of either 26 or 107 milliradians. The range of this particular embodiment of sensor is approximately 225-775 feet and the signal-to-noise ratio is 13 dB. The sensor operates at a data band width of 15 kHz which was selected to provide information at one foot intervals for a spot moving at 8000 fps. Power dissipation of this particular sensor is less than 40 watts, weight is less than 5 pounds, and size is less than $6 \times 6 \times 3$ inches. It is particularly well suited for deployment on board weapons systems and the like. A similar system was constructed utilizing a helium-neon laser operating at 632.8 n.m., and was likewise found to provide excellent results.

Figure 7:
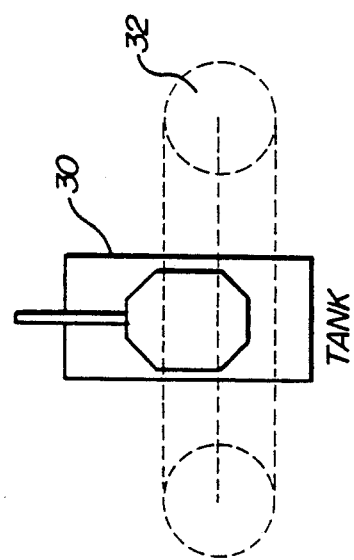
FIG. 7 is a stylized representation of a sensor beam and a first target object, accompanied by a graphic representation of the output signal corresponding thereto.
Figure 7:
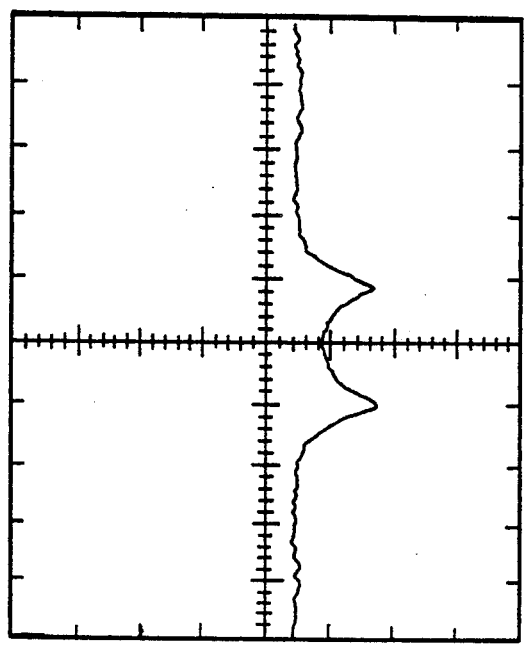
Figure 8:
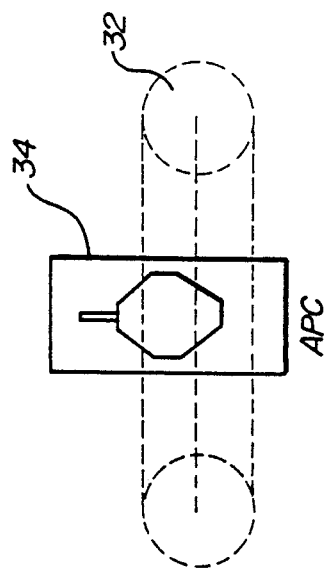
FIG. 8 is a stylized representation of a sensor beam and a second target object, accompanied by a graphic representation of the output signal corresponding thereto.
Figure 8:
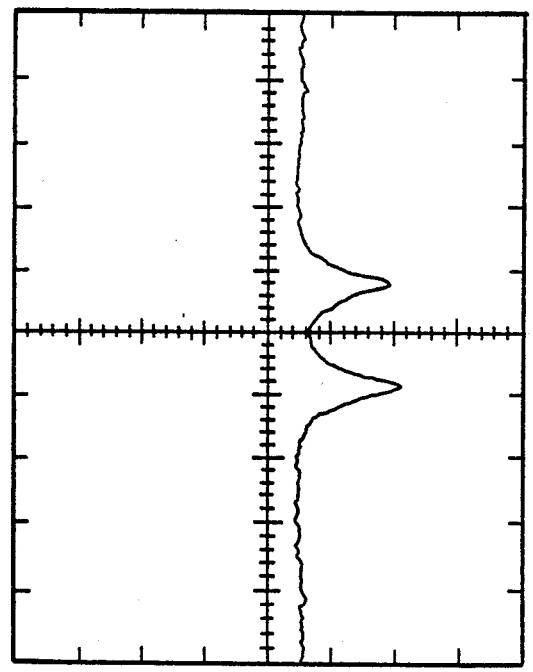
Figure 9:
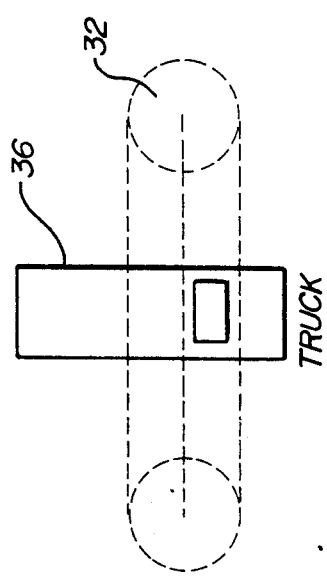
FIG. 9 is a stylized representation of a sensor beam and a third target object, accompanied by a graphic representation of the output signal corresponding thereto.
Figure 9:
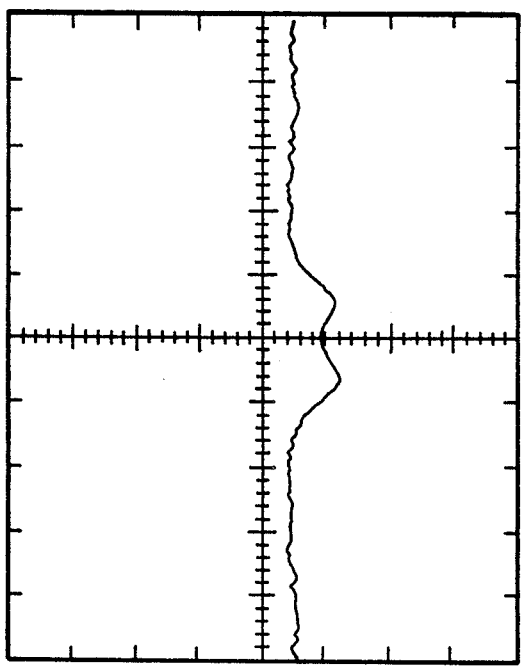

Various experiments were carried out utilizing the sensor of the present invention in conjunction with various simulated scale model vehicles. FIGS. 7-9 detect the results of such tests as carried out in a non-imaging mode and demonstrate that the method of the present invention may readily detect and discern between a variety of targets. In all of the following, the light source was a mode locked helium-neon laser, the modulation frequency was set to provide a return null signal at a step height equal to the hull height of the tank. In the simulations the hull height (h) of the tank model was approximately 3 cm and hence the modulation frequency was approximately $2.5 \times 10^9$. For full size vehicles this frequency will obviously decrease by approximately two orders of magnitude. Data is displayed in a log format; therefore the null signal is represented as a negative signal rather than 0. The data rate employed is approximately 8.5 kHz.

FIG. 7 depicts a test showing the relative position of the target tank 30 and the sensor beam 32 as it is swept thereacross. The width of the beam was set to be approximately equal to the width of the tank. Graphically depicted below the tank 30, is a representation of the output signal generated by the sensor. As it can be seen, the signal includes two null points corresponding to the steps created by the hull of the tank with respect to the background. The spacing of the null points corresponds generally to the width of the tank.

FIG. 8 is a similar depiction of data generated by the scanning of a simulated armored personnel carrier 34 with the same beam. The graphic representation of the data from the scan of the armored personnel carrier 34 also includes two null points; however, an inspection thereof indicates that their spacing is different from that of the null points generated by the tank and that this spacing corresponds to the width of the armored personnel carrier (A.P.C.). It will additionally be noted that the slope of the signals toward each null point differs for each target.

Referring now to FIG. 9, there is shown a similar set of data for a truck 36 scanned with the same beam 32. It will be seen from the graphic representation of the data of FIG. 9 that no clear null points are obtained and the output signature of the sensor is significantly different than that of the other targets. By the use of appropriate targeting algorithms, these outputs may be correlated with the appropriate vehicle and the tank, apc or truck may be selectively identified and located within a target zone.

Figure 10:
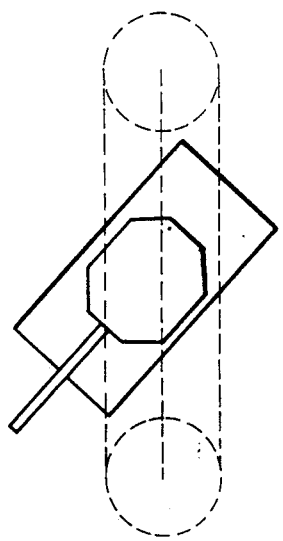
FIG. 10 is a stylized representation of the sensor beam and target object of FIG. 7 illustrating a sensor beam scan at an angle oblique to the target, and accompanied by a graphic representation of the output signal corresponding thereto.
Figure 10:
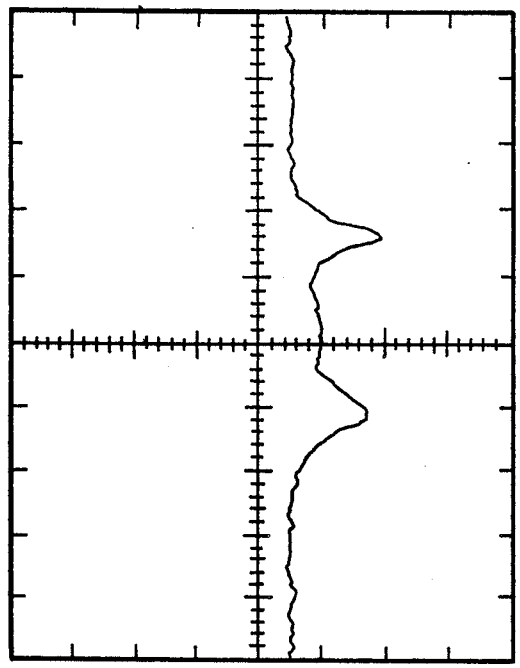

As the aspect of the target presented to the beam changes, the output signal will change accordingly. However, such new signals will still correspond uniquely to the target and may be correlated therewith. Referring now to FIG. 10, there is shown a scan made of the tank at an oblique angle. It is noted that the signal still includes null points and is of uniquely characteristic shape. Similar data was obtained from an oblique scan of the apc and the truck and confirms that output spectra correlatable with the target objects result from the use of the present invention.

Figure 11:
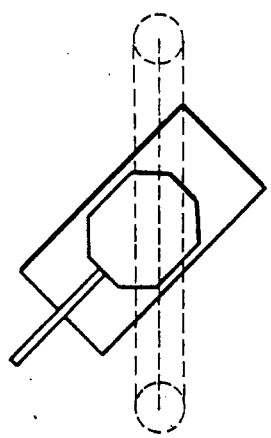
FIG. 11 is a stylized representation of the target object of FIGS. 7 and 10 as scanned by a sensor beam of reduced diameter, and including a graphic representation of the output signal corresponding thereto.
Figure 11:
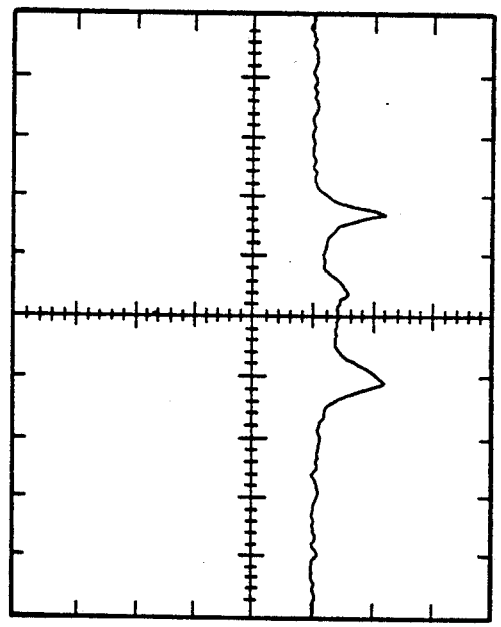

Changing the size of the beam will change the resolution of the target to some degree, with a smaller beam producing a somewhat more detailed output. Referring now to FIG. 11, there is shown a scan made in a manner generally similar to that of FIG. 10 but with a beam half the diameter of the FIG. 10 beam. It will be noted that the resultant output curve includes somewhat more detail, particularly relating to the surface of the tank turret.

Figure 12:
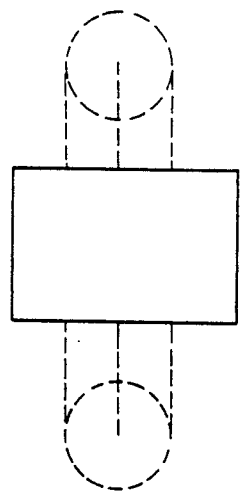
FIG. 12 is a stylized representation of a sensor beam as disposed to scan a planar, light absorbing body, accompanied by a graphic representation of the output signal corresponding thereto.
Figure 12:
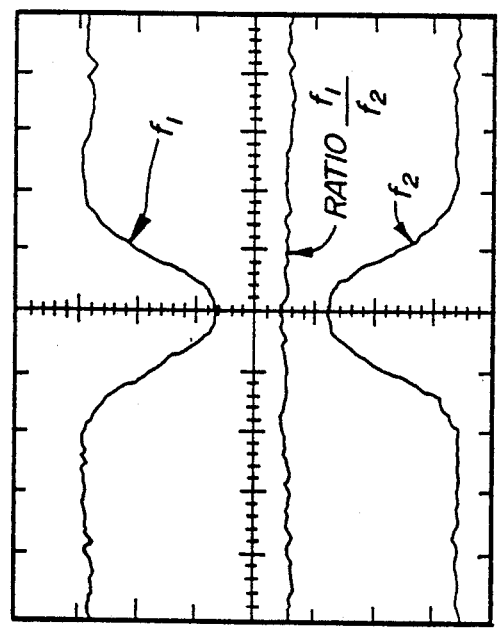

The independence of the ratio signal to reflectivity is depicted in the scan of FIG. 12. In this experiment, the sensor beam was swept across a black absorbing panel on a white background. The panel was planar and presented no significant step. The accompanying chart displays the signals from the first frequency $f_1$, the second frequency $f_2$ and the ratio thereof. It should be noted that for display purposes, signals $f_1$ and $f_2$ have been displaced and inverted relative to one another. What will be noted is that at all times the ratio of the two signals remains constant. Even though the reflected light is minimal for the black panel, the ratio of signal $f_1$ to $f_2$ is unchanged and essentially linear, albeit some noise is noticed therein, attributable to the fact that signal-to-noise ratio of the system is very low at this low reflectivity. The foregoing examples make clear that the method and apparatus of the present allow for generation of a signal uniquely characteristic of an object without interference caused by non-uniform reflectivity.

The signals displayed with reference to FIGS. 7-11 may obviously be displayed in other formats. For example, the signals may be displayed on a color coded basis wherein a null signal is represented by a black (or white) pixel whereas values approaching the null point can be represented by varying shades of gray. Obviously, a false color image may be similarly generated.

An image of a target zone may be built up by repeatedly scanning the sensor thereacross and visually displaying the sensor output in appropriate shades. Such an imaging mode is depicted in FIGS. 13a–c.

FIG. 13a is a photograph of a simulated target concealed by foliage. FIG. 13b is an image created by scanning the scene of FIG. 13a with the range dispersion sensor of the present invention utilizing a beam width which is approximately equal to half the width of the vehicle and having a frequency f1 set to correspond to the step height of the vehicle. The image is made up of approximately 256 scan lines and 65,536 pixels. Imaging processing is implemented in a mode wherein an approximate null signal is indicated as a dark pixel and corresponding deviations therefrom as shades of gray. It will be noted from the figure that the edges of the target appear accentuated over those in the photographic image and that the target stands out from ground clutter. Furthermore, shadows are removed.

FIG. 13c is the same image but utilizing a beam width which is approximately 1/20 the width of the vehicle. It will be noted that resolution is improved significantly and edges are still clearly accentuated.

By modulating the light beam at still further frequencies selected to produce nulls at other heights, various other features of the target may be preferentially accentuated. Images of this type may be variously process and displayed; for example, a scene or a target zone may be displayed to accentuate or otherwise selectively depict only those objects of preselected heights. Such an image can thus selectively display tanks, or trucks, or other such vehicles in a scene and furthermore could select and display only particular models of tanks or other vehicles. Other variations of display format could likewise be implemented. The images of FIGS. 13B and 13C were made using a helium-neon laser operating at approximately 633 nm. By use of millimeter wavelengths or microwaves, selected to penetrate the background foliage, images could be made without interference from vegetation.

The range dispersion sensor of the present invention may be manufactured to be small, lightweight and low in cost and hence lends itself for widespread use in a variety of systems. For example, the sensor can be mounted within a weapon system and scanned across a target zone by motion of the system. In addition to the applications described hereinabove, it is to be understood that the herein disclosed sensor may also be employed in various robotic vision systems for automated assembly, materials handling, navigation systems and the like. In view of the many variations in the implementation and use of the present invention, it will be appreciated that the foregoing is merely to illustrate the invention and not a limitation on the practice thereof. It is the following claims, including all equivalents which are meant to define the present invention.

I claim:

1. A range dispersion sensor comprising:
   a source operative to provide an output beam of electromagnetic energy;
   a modulator associated with the source and operative in conjunction therewith to modulate the output beam at a first frequency "$f_1$" with a second frequency "$f_2$";
   means for directing said beam of electromagnetic energy onto a target zone for reflection therefrom;
   means for detecting the reflected energy and providing a first detector signal corresponding to detected energy modulated at $f_1$ and a second detector signal corresponding to detected energy modulated at $f_2$;
   and processing means for receiving and comparing said first and second detector signals and providing an output signal corresponding to the ratio thereof said output signal indicative of the range dispersion of said target zone.

2. A range dispersion sensor as in claim 1, operative to detect the presence of objects of a preselected height "h" disposed upon the surface of the target zone wherein
   said modulator is operative to modulate the output beam at a first frequency "$f_1$" such that $f_1 = (c/4h)$, wherein c is the speed of light.

3. A range dispersion sensor as in claim 2, wherein said modulator is operative to modulate the output beam at a second frequency "$f_2$" such that $f_2 \neq (c/4h)$, wherein said first detector signal corresponds to both the height of the object and the intensity profile of the reflected energy and the second signal corresponds to the intensity profile of the reflected energy.

4. A range dispersion sensor as in claim 3, wherein said processing means is operative to measure the ratio of the first detector signal to the second detector signal so as to provide an output signal normalized with regard to reflection and indicative of the heights of objects in the target zone.

5. A range dispersion sensor as in claim 1, wherein said source is a laser.

6. A range dispersion sensor as in claim 5, wherein said laser is a gallium arsenide laser having an output at 811 nm.

7. A range dispersion sensor as in claim 5, wherein said laser is a helium-neon laser having an output at approximately 633 nm.

8. A range dispersion sensor as in claim 1, wherein said source is a source of microwave energy.

9. A range dispersion sensor as in claim 1, wherein said source is a source of electromagnetic energy in the millimeter wavelength range.

10. A range dispersion sensor as in claim 1, wherein said detecting means includes at least one photoresponsive device.

11. A range dispersion sensor as in claim 1, wherein said detecting means includes a first band pass filter operative to pass signals having a frequency of $f_1$.

12. A range dispersion sensor as in claim 1, wherein said detecting means further includes a second band pass filter operative to pass signals having a frequency of $f_2$.

13. A range dispersion sensor as in claim 1, wherein said modulator is further operative to modulate the output beam at a third frequency "$f_3$" and wherein said detecting means is operative to detect electromagnetic energy modulated at $f_3$ and provide a third detector signal corresponding thereto.

14. A range dispersion sensor as in claim 1, wherein said modulator is further operative to modulate the output beam at a plurality of discrete frequencies "$f_3 \ldots f_n$" and wherein said detector means is operative to detect the reflected beam at each of the plurality of frequencies and provide discrete detector signals corresponding to each of said frequencies.

15. A range dispersion sensor as in claim 1, further including display means operative to receive the output signal, process said signal and provide a visual display corresponding thereto.

16. A range dispersion sensor as in claim 1, wherein said processing means is operative to provide an output signal in machine readable form.

17. A range dispersion sensor as in claim 1, wherein said beam directing means is operative to scan the beam across the target zone.

18. A range dispersion sensor as in claim 17, wherein said beam directing means is operative to scan said beam across the target zone in a raster pattern.

19. A range dispersion sensor as in claim 1, wherein said modulator modulates the output beam at a second frequency $f_2$ which is essentially zero.

20. A range dispersion sensor for determining the presence of objects of a given height "h" within a target zone and comprising:
   a source operative to provide an output beam of essentially monochromatic electromagnetic energy;
   a modulator associated with the source and operative in conjunction therewith to modulate the output beam at a first frequency "$f_1$" such that $f_1=(c/4h)$ wherein c equals the speed of light, and further operative to modulate the output beam at a second frequency "$f_2$" such that $f_2 \neq (c/4h)$;
   means for directing said beam of light onto the target zone for reflection therefrom;
   detector means for detecting the reflected beam modulated at $f_1$ and providing a first detector signal corresponding to the heights of objects in the target zone as well as the reflectivity thereof, and a second signal corresponding to reflected light modulated at $f_2$ and corresponding to the intensity of light reflected from the target zone;
   processing means for receiving said first and second detector signals and determining the ratio of the first signal to the second signal so as to provide an output signal normalized with regard to reflectivity and corresponding to the range dispersion of objects within the target zone said output signal including minima indicative of odd integer multiples of h.

21. A method for determining the heights of objects in a target zone while normalizing for differential reflectivities therein, said method including the steps of:
   providing a source of electromagnetic energy;
   modulating the electromagnetic energy at a first frequency "$f_1$" and a second frequency "$f_2$";
   directing the modulated energy onto the target zone for reflection therefrom;
   detecting the reflected energy modulated at said first frequency with a detector operative to provide a first detector signal corresponding thereto;
   detecting the energy modulated at said second frequency with a detector operative to provide a second detector signal corresponding thereto;
   determining the ratio of said detector signals and providing an output signal corresponding to said ratio said output signal indicative of the heights of the objects in the target zone.

22. A method as in claim 21 for detecting the presence of objects of a preselected height "h" disposed on a surface of the target zone, said method including the step of:
   modulating the electromagnetic energy at a first frequency $f_1$ such that $f_1=(c/4h)$ wherein c is the speed of light.

23. A method as in claim 22 including the step of:
   modulating the electromagnetic energy at a second frequency $f_2$ such that $f_2 \neq (c/4h)$, wherein the first detector signal corresponds to both the height of the object and the intensity profile of the reflected light and the second detector signal corresponds to the intensity profile of the reflected energy.

24. A method as in claim 21, wherein the step of determining the ratio of detector signals comprises determining the ratio of the first detector signal to the second detector signal whereby an output signal normalized with regard to reflectivity and indicative of the height of objects in the target zone is provided.

25. A method as in claim 21, wherein said second frequency $f_2$ is essentially zero.

* * * * *